United States Patent
Murase

(10) Patent No.: US 10,188,178 B2
(45) Date of Patent: Jan. 29, 2019

(54) BUCKLE FOR SEATBELT DEVICE

(71) Applicant: AUTOLIV DEVELOPMENT AB, Vargarda (SE)

(72) Inventor: Yushi Murase, Yokohama (JP)

(73) Assignee: AUTOLIV DEVELOPMENT AB, Vargarda (SE)

(*) Notice: Subject to any disclaimer, the term of this patent is extended or adjusted under 35 U.S.C. 154(b) by 0 days.

(21) Appl. No.: 15/814,915

(22) Filed: Nov. 16, 2017

(65) Prior Publication Data
US 2018/0078002 A1    Mar. 22, 2018

Related U.S. Application Data

(63) Continuation of application No. 14/781,462, filed as application No. PCT/JP2014/055183 on Feb. 28, 2014, now Pat. No. 9,877,548.

(30) Foreign Application Priority Data

Apr. 18, 2013  (JP) ................... 2013-087328

(51) Int. Cl.
*A44B 11/25*   (2006.01)
*B60R 22/02*   (2006.01)

(52) U.S. Cl.
CPC ...... *A44B 11/2538* (2013.01); *A44B 11/2546* (2013.01); *B60R 22/02* (2013.01); *B60R 2022/021* (2013.01)

(58) Field of Classification Search
CPC . A44B 11/2538; A44B 11/2546; B60R 22/02; B60R 2022/021; B60R 22/12; B60R 22/22
See application file for complete search history.

(56) References Cited

U.S. PATENT DOCUMENTS

| | | | |
|---|---|---|---|
| 4,142,737 A | 3/1979 | Marsh et al. | |
| 5,292,181 A | 3/1994 | Dybro | |
| 5,443,302 A | 8/1995 | Dybro | |
| 6,830,406 B2 | 12/2004 | Kim et al. | |
| 8,402,617 B2 | 3/2013 | Wang | |

(Continued)

FOREIGN PATENT DOCUMENTS

| | | |
|---|---|---|
| JP | 4-76815 B2 | 12/1992 |
| JP | H09267711 A | 10/1997 |

(Continued)

OTHER PUBLICATIONS

International Search Report of PCT/JP2014/055183 dated May 27, 2014.

*Primary Examiner* — Robert Sandy
*Assistant Examiner* — Louis A Mercado
(74) *Attorney, Agent, or Firm* — Brinks Gilson & Lione

(57) ABSTRACT

A buckle in a seatbelt apparatus includes a buckle stay (20), a buckle base (10) coupled to the buckle stay so as to be able to tilt in a first direction X and to pivot in a second direction Y, with respect to the buckle stay (20), and an elastic member that returns the buckle base (10) tilted in the first direction X and the buckle base (10) pivoted in the second direction Y to an original position. A support shaft (30) has a pair of arm portions (32) provided at an upper portion (31) of the support shaft (30) and extending in a lateral direction. Tip portions of the arm portions (32) are coupled into respective engagement grooves (16) formed in a pair of side plate portions (12) of the buckle base (10).

10 Claims, 11 Drawing Sheets

(56) References Cited

U.S. PATENT DOCUMENTS

| | | |
|---|---|---|
| 9,015,913 B2 | 4/2015 | Kaisha et al. |
| 2008/0040003 A1 | 2/2008 | Kroeninger et al. |
| 2013/0174390 A1 | 7/2013 | Muromachi et al. |

FOREIGN PATENT DOCUMENTS

| | | |
|---|---|---|
| JP | 2001010442 A | 1/2001 |
| JP | 2002178876 A | 6/2002 |
| JP | 2012179997 A | 9/2012 |

BUCKLE FOR SEATBELT DEVICE

CROSS-REFERENCE TO RELATED APPLICATIONS

This application is a continuation of U.S. patent application Ser. No. 14/781,462, filed Sep. 30, 2015, now U.S. Pat. No. 9,877,548, which is a 35 U.S.C. § 371 national phase application of PCT International Application No. PCT/JP2014/055183, filed Feb. 28, 2014, which claims the benefit of priority under 35 U.S.C. § 119 to Japanese Patent Application No. 2013-087328, filed Apr. 18, 2014, the contents of which are incorporated herein by reference in their entirety.

FIELD OF THE INVENTION

The present invention relates to a buckle in a seatbelt apparatus for motor vehicle applications.

DESCRIPTION OF THE RELATED ART

As a seatbelt apparatus installed in a seat in a vehicle, a three-point seatbelt apparatus and a two-point seatbelt apparatus are known. Such a seatbelt apparatus is configured such that a tongue attached to webbing is engaged with a buckle installed at a side of a seat in order to protect an occupant.

The buckle in a seatbelt apparatus transmits, to a vehicle body, a tensile load acting on the webbing at the time of a collision of the vehicle. A metallic buckle base included in a buckle main body is fixed to the seat or a vehicle body floor via a metallic buckle stay (also referred to as a stalk).

As depicted in FIGS. 9(A) and (B) and FIGS. 10(A) and (B) appended to this description, the representative buckle includes a metallic buckle stay 101 and a buckle main body 102 supported at an upper end of the buckle stay 101. The buckle main body 102 includes a tongue insertion port, a lock mechanism, and an unlock mechanism (none of which is depicted in the referenced drawings).

The buckle main body 102 supported at the upper end of the buckle stay 101 is generally provided so as to be able to tilt in a seat width direction with respect to the buckle stay 101 and to pivot in a seat front-rear direction, from an original position depicted in FIG. 9A and FIG. 10A to a movable position depicted in FIG. 9B and FIG. 10B (see FIG. 9B and FIG. 10B). The buckle main body 102 is biased by an elastic member installed in the buckle main body 102 and not depicted in the drawings such that, when no external force acts on the buckle main body 102, the position of the buckle main body 102 relative to the buckle stay 101 returns to the original position.

FIG. 11 appended to this description will is an exploded perspective view depicting a configuration of a main part of a conventional buckle described in Japanese Patent Application Laid-open No. 2002-178876.

The buckle includes a buckle stay 210, a buckle base 220, a support shaft (for example, a rivet) 230, a coil spring 240 that is an elastic member, and a spring holding member 250.

The buckle stay 210 has a fixation portion 211 located at a base end of the buckle stay 210 and fixed to the vehicle body and a coupling plate portion 213 located at a leading end of the buckle stay 210 and having a circular through-hole 212 formed therein. On the other hand, the buckle base 220 has a C-shaped section defined by a bottom plate portion 221 and a pair of side plate portions 222 standing up from opposite side edges of the bottom plate portion 221.

In the buckle base 220, a portion of an upper surface of the bottom plate portion 221 located at one end thereof is made to overlap with the coupling plate portion 213 of the buckle stay 210. The portion of the upper surface that is made to overlap with the coupling plate portion 213 allows the buckle base 220 to be coupled to the buckle stay 210 via the support shaft 230 inserted through the through-holes 212 and 223 in the bottom plate portion 221 and the coupling plate portion 213. At this time, the support shaft 230 is loosely inserted through the through-hole 212 in the coupling plate portion 213 of the buckle stay 210. By having the portions coupled together via the support shaft 230 as a point of support, the buckle base 220 can tilt through a predetermined angle in a first direction (the direction of arrow X) perpendicular to a plate surface of the bottom plate portion 221 of the buckle base 220 and can pivot through a predetermined angle in a second direction (the direction of arrow Y) parallel to the plate surface of the bottom plate portion 221 of the buckle base 220, with respect to the buckle stay 210. In this case, the bottom plate portion 221 of the buckle base 220 is arranged to lie in a generally vertical plane including the front-rear direction and up-down direction of the vehicle, and thus, a first direction X perpendicular to the plate surface of the bottom plate portion 221 corresponds to the seat width direction, and a second direction Y parallel to the plate surface of the bottom plate portion 221 corresponds to the seat front-rear direction.

The coil spring 240 is arranged on the coupling plate portion 213 of the buckle stay 210 so as to be fitted around the support shaft 230. A lower end of the coil spring 240, when engaged with the buckle stay 210, pushes the coupling plate portion 213 of the buckle stay 210 downward. An upper end of the coil spring 240, when engaged with the cap-like spring holding member 250, is fixed to the buckle base 220 via the spring holding member 250. When the buckle base 220 tilts in the first direction X with respect to the buckle stay 210, the coil spring 240 is compressively deformed to return the buckle base 220 to the original position. When the buckle base 220 pivots in the second direction Y with respect to the buckle stay 210, the coil spring 240 is torsionally deformed to return the buckle base 220 to the original position.

The buckle depicted in FIG. 11 uses the coil spring 240 as an elastic member, but buckles are known which use an elastomer such as rubber instead of the coil spring 240.

The use of the coil spring as an elastic member needs the use of a dedicated spring holding member, disadvantageously leading to an increased height of a portion to which the spring is assembled and an increased thickness of the buckle.

Furthermore, when the coil spring is used, since an end of the coil spring is fixed to the buckle base via the dedicated spring holding member, the strength with which the coil spring is held on the buckle stay is determined by the strength of the spring holding member. Thus, disadvantageously, the holding strength of the buckle stay is likely to decrease. These problems also occur when the elastomer such as rubber is used as an elastic member.

The present invention has been developed in view of these circumstances. An object of the present invention is to provide a buckle in a seatbelt apparatus that enables a reduction in the height of the portion to which the spring is assembled, while enabling an increase in the strength with which the spring is held on the buckle stay.

SUMMARY OF THE INVENTION

An object of the present invention is accomplished by the following configuration.

A buckle in a seatbelt apparatus including:

a buckle stay that has a fixation portion provided at a base end of the buckle stay and fixed to a vehicle body, and a coupling plate portion provided at a leading end of the buckle stay and having a through-hole;

a buckle base having a bottom plate portion and a pair of side plate portions standing up from opposite side edges of the bottom plate portion, the buckle base also having a through-hole formed at one end of the bottom plate portion in a length direction of the bottom plate portion;

a support shaft inserted through the through-holes in the coupling plate portion of the buckle stay and at the one end of the bottom plate portion, the support shaft being loosely inserted through the through-hole in the coupling plate portion, to allow the buckle base to be coupled to the buckle stay so as to be able to tilt, with respect to the buckle stay, through a predetermined angle in a first direction perpendicular to a plate surface of the bottom plate portion and so as to be able to pivot, with respect to the buckle stay, through a predetermined angle in a second direction parallel to the plate surface of the bottom plate portion; and an elastic member that is, when the buckle base tilts in the first direction and pivots in the second direction, pushed by the buckle stay and elastically deformed so as to return the buckle base to an original position, wherein the support shaft has a pair of arm portions provided at an upper portion of the support shaft and extending in a lateral direction, and tip portions of the arm portions are coupled into respective engagement grooves formed in a pair of side plate portions of the buckle base.

The invention also encompasses a seatbelt apparatus including the buckle described herein.

In the buckle in a seatbelt apparatus in the present invention, the support shaft has the pair of arm portions located at the upper portion of the support shaft and extending in the lateral direction, and the tip portions of the arm portions are coupled into the respective engagement grooves formed in the pair of side plate portions of the buckle base. Thus, the elastic member can be assembled directly to the buckle base without using a dedicated spring holding member. This enables a reduction in the height of the portion to which the elastic member is assembled and in the thickness of the buckle. Furthermore, the support shaft is coupled directly to the side plate portions of the buckle base, eliminating the need for the dedicated spring holding member. This enables a reduction in the number of components and an increase in the strength with which the elastic member is held on the buckle stay.

DESCRIPTION OF THE PREFERRED EMBODIMENTS

A buckle in a seatbelt apparatus according to an embodiment of the present invention will be described below in detail based on the drawings.

Figure 1:
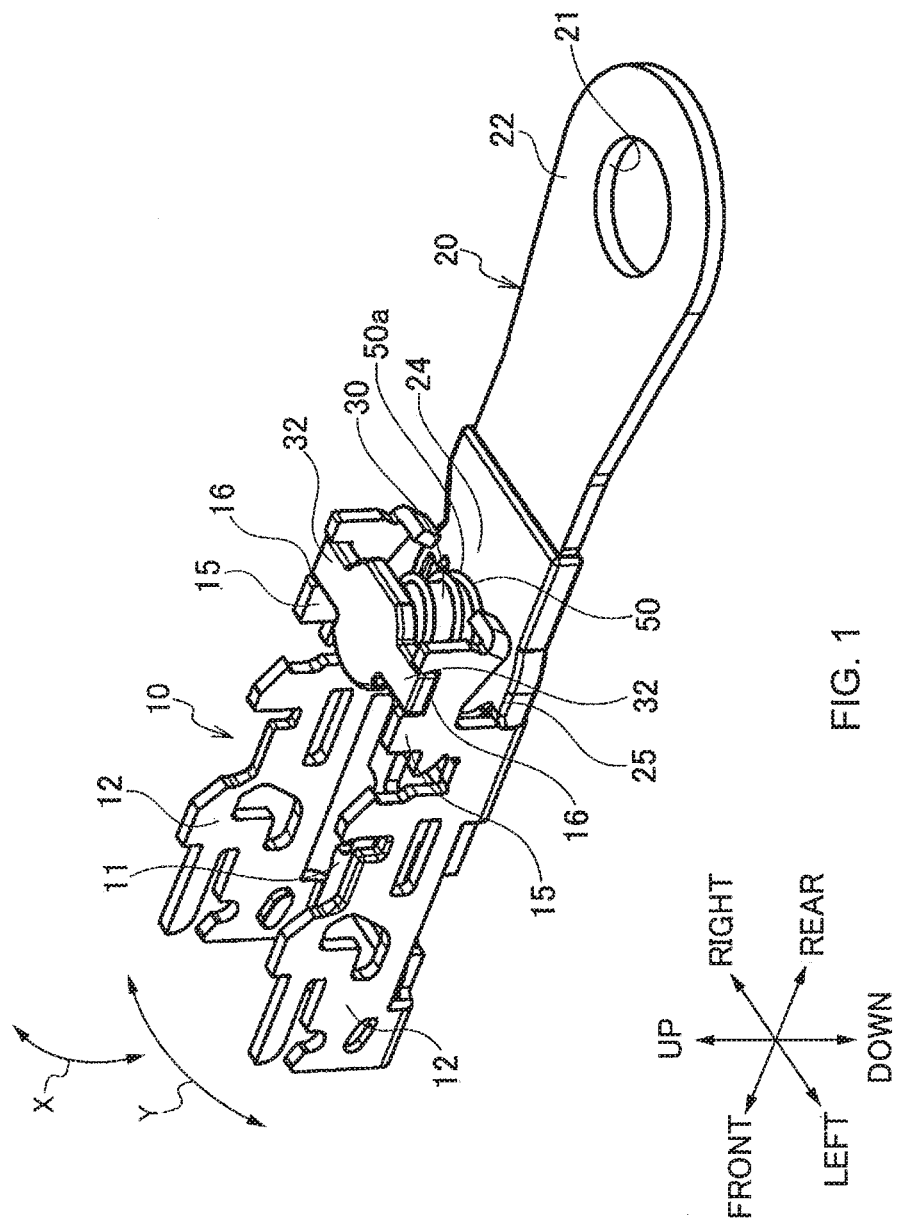
FIG. 1 is a perspective view depicting a configuration of an important part of a buckle in a seatbelt apparatus according to an embodiment of the present invention.
Figure 2C:
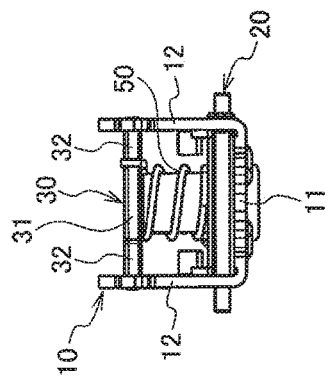
FIG. 2C is a front view of the buckle.
Figure 2A:
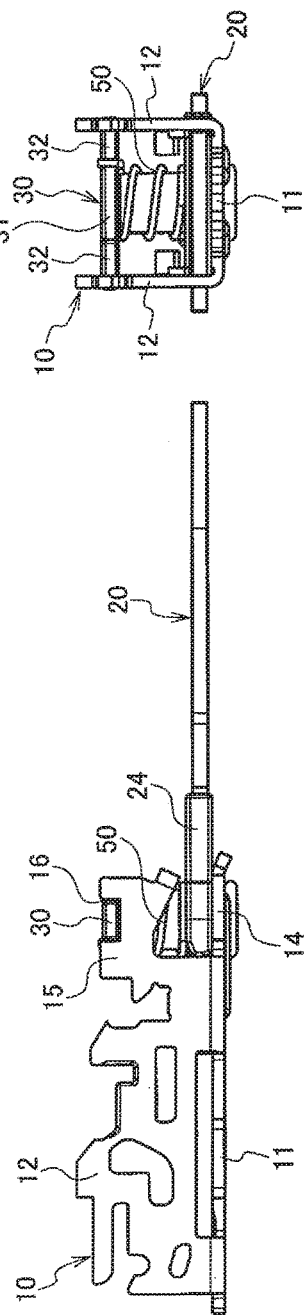
FIG. 2A is a side view of the buckle in FIG. 1.
Figure 2B:
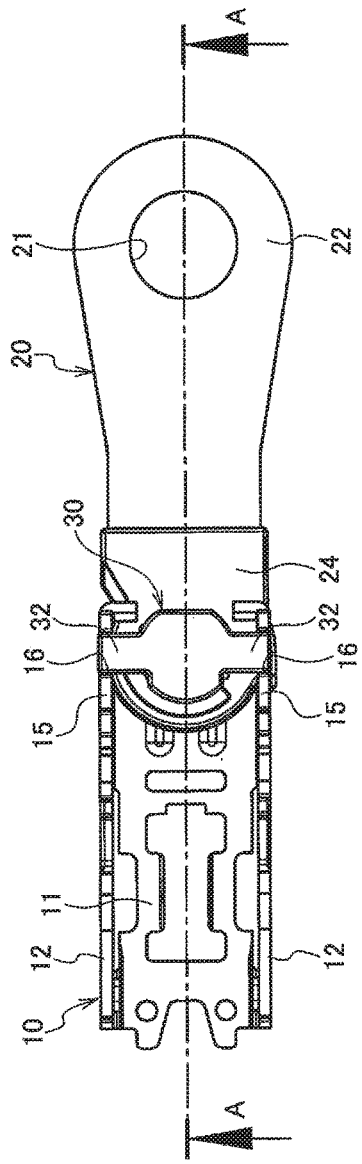
FIG. 2B is a top view of the buckle.

As depicted in FIG. 1 and FIG. 2, the buckle includes a channel-shaped buckle base 10, a flat-plate-shaped buckle stay 20, a support shaft 30 including a rivet, and a coil spring 50 used as an elastic member.

Figure 9A:
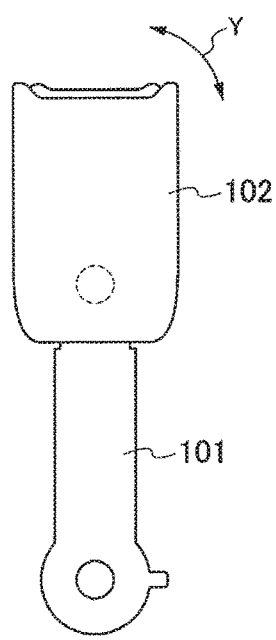
FIG. 9A is a diagram depicting a moving direction of a buckle main body of a representative buckle as viewed from a side of a seat and illustrating a state where the buckle main body is in an original position.
Figure 9B:
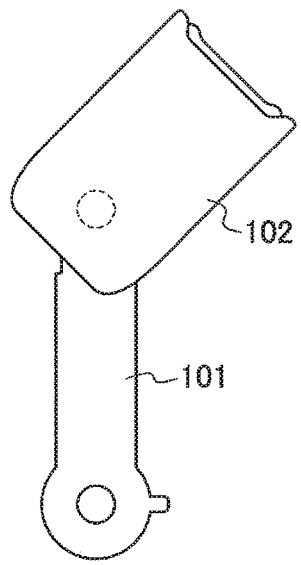
FIG. 9B is a diagram depicting the moving direction of the buckle main body of the representative buckle as viewed from the side of the seat and illustrating a state where the buckle main body has pivoted in a seat front and rear direction.
Figure 10A:
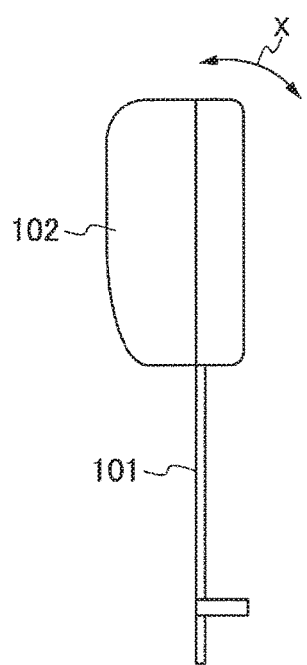
FIG. 10A is a diagram depicting the moving direction of the buckle main body of the representative buckle as viewed from a front of the seat and illustrating a state where the buckle main body is in the original position.
Figure 10B:
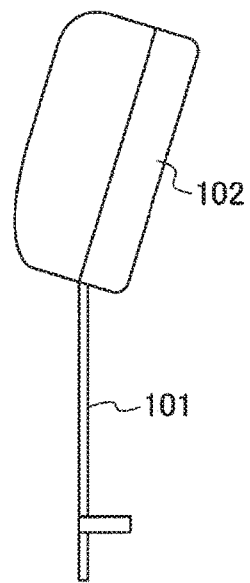
FIG. 10B is a diagram depicting the moving direction of the buckle main body of the representative buckle as viewed from the side of the seat and illustrating a state where the buckle main body has tilted in a seat width direction.
Figure 11:
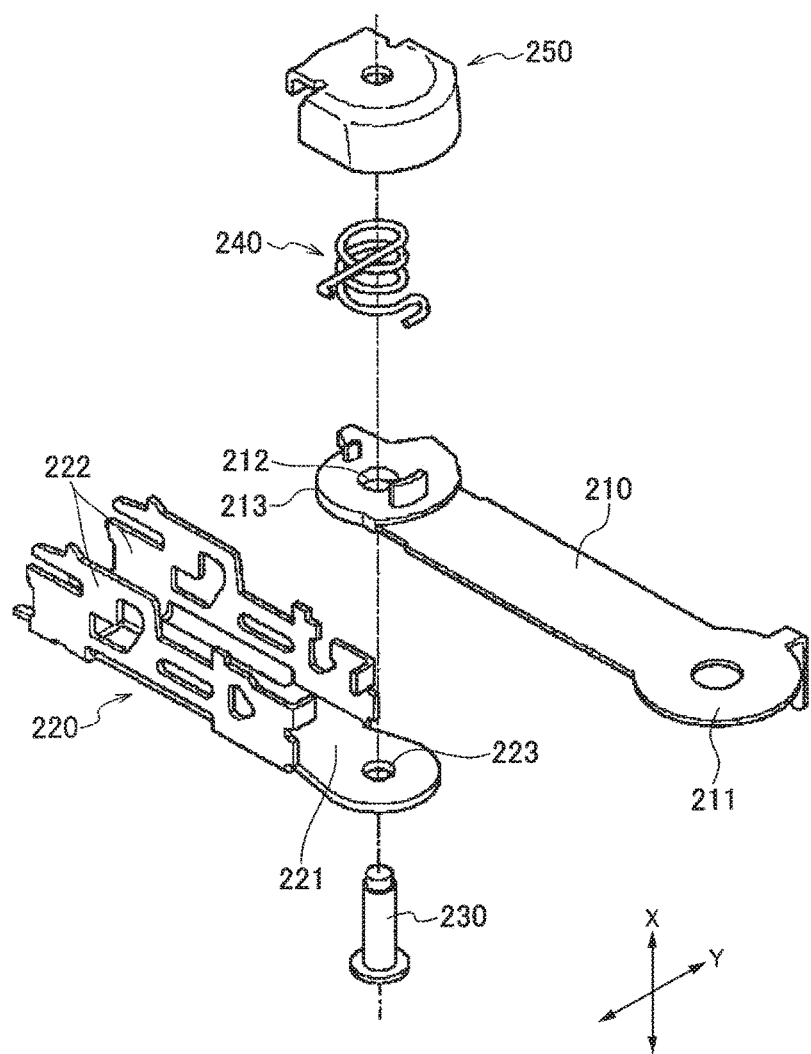
FIG. 11 is an exploded perspective view depicting an example of a conventional buckle in accordance with the prior art.

As depicted in FIG. 1, the buckle base 10 is a base member installed in a buckle main body 102 depicted in FIG. 9 and FIG. 10 and has a C-shaped section defined by a bottom plate portion 11 and a pair of side plate portions 12 standing up from opposite side edges of the bottom plate portion 11. A through-hole 13 is formed at an end 14 of the bottom plate portion 11 in a length direction thereof (see FIG. 3). An upper edge of the side plate portion 12 at a front-rear-wise position where the through-hole 13 is formed serves as a fixation portion 15. An engagement groove 16 is formed in the fixation portion 15 such that an arm portion 32 provided on an upper portion 31 of the support shaft 30 and described below is fixed in the engagement groove 16.

In the description below, an up-down direction is defined as a direction perpendicular to the plate surface of the bottom plate portion 11, a lateral direction is defined as a width direction of the bottom plate portion 11, and the front-rear direction is defined as a longitudinal direction of the bottom plate portion 11. When the buckle of the present embodiment is installed at the side of a seat, the up-down direction corresponds to the seat width direction, the lateral direction corresponds to the seat front-rear direction, and the front-rear direction corresponds to a direction in which a tongue is inserted and removed.

The buckle stay 20 is a member shaped generally like a stay plate and has a fixation portion 22 located at a base end of the buckle stay 20 and that is fixed to a vehicle body and a coupling plate portion 24 located at a leading end of the buckle stay 20 and that is coupled to the buckle base 10. The fixation portion 22 fixed to the vehicle body has an attachment hole 21 through which the fixation portion 22 is fixed to the vehicle body. The coupling plate portion 24 has a through-hole 23 through which the coupling plate portion 24 is coupled to the buckle base 10.

Figure 3:
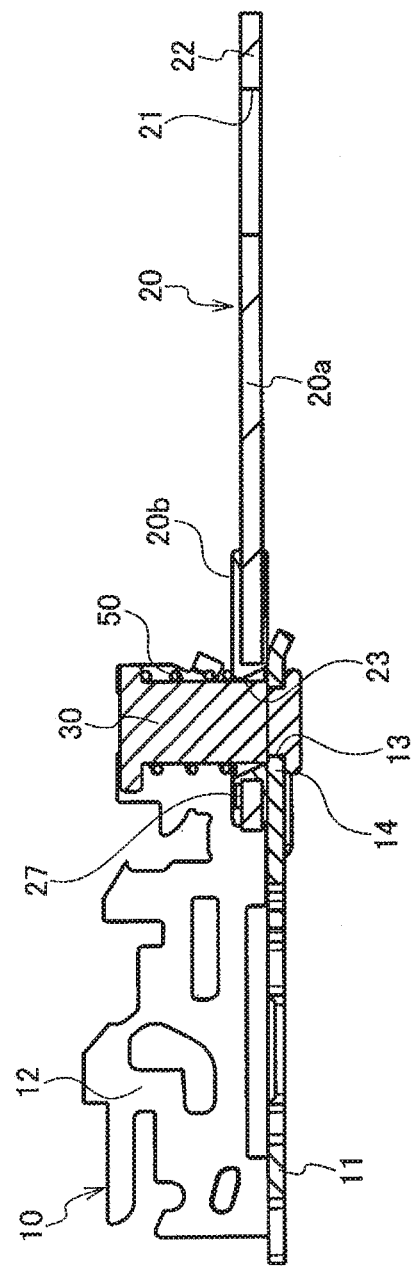
FIG. 3 is a sectional view of the buckle taken along line A-A in FIG. 2B.
Figure 4:
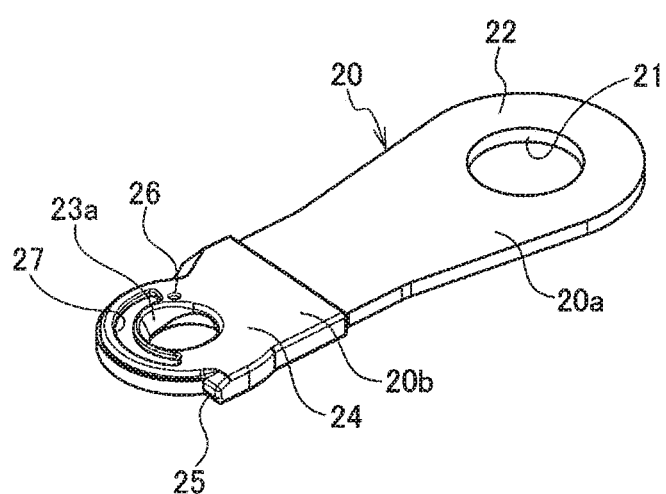
FIG. 4 is a perspective view depicting a configuration of a buckle stay used for the buckle of the present embodiment.
Figure 5:
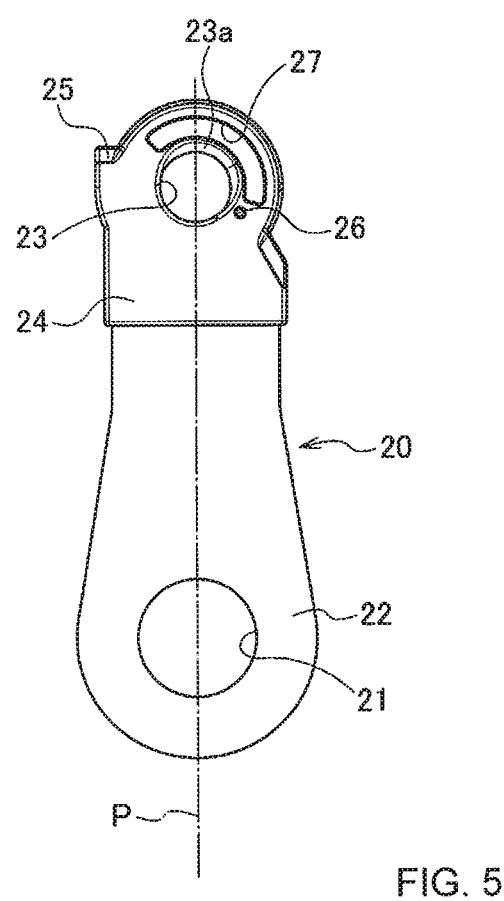
FIG. 5 is a front view of the buckle stay in FIG. 4.

As depicted in FIG. 3 and FIG. 4, the buckle stay 20 includes a stay main body 20a formed of a metallic plate and a collar 20b made of resin. The collar 20b is integrally formed at a leading end of the stay main body 20a. The collar 20b forms an inner peripheral wall of the through-hole 23. In a part of the inner peripheral wall, an inclined portion 23a is provided which enables the buckle stay 20 to be naturally tilted while avoiding interference with the support shaft 30 when the buckle stay 20 is tilted relative to the buckle base 10.

At the leading end of the buckle stay 20, a stopper 25 is provided which regulates the buckle stay 20 such that the buckle stay 20 can pivot toward one side relative to the buckle base 10 but fails to pivot toward the other side relative to the buckle base 10. The stopper 25 comes into abutting contact with a part of the side plate portion 12 of the buckle base 10 to hinder the relative pivoting of the buckle stay 20 toward the other side.

A fixation hole 26 is formed around the through-hole 23 at the leading end of the buckle stay 20 such that an end 50a of the coil spring 50 is fixed through the fixation hole 26. In the collar 20b, a spring housing groove 27 is formed around the through-hole 23 in the buckle stay 20 and along a circumferential direction of the through-hole 23. The spring housing groove 27 is formed to be laterally asymmetric with respect to a longitudinal center line P of the buckle stay 20 that passes through the center of the through-hole 23 in the buckle stay 20. Specifically, the spring housing groove 27 extends from a position adjacent to the fixation hole 26 toward the front of the through-hole 23 along the circumferential direction of the through-hole 23 and at least beyond the front of the through-hole 23.

Thus, the coil spring 50 is fitted into the spring housing groove 27 when the buckle stay 20 tilts in the first direction X relative to the buckle base 10.

The buckle base 10 is coupled to the coupling plate portion 24 of the buckle stay 20 via the support shaft 30. Specifically, a portion of an upper surface of the bottom plate portion 11 located at the end 14 thereof is laid on top of the coupling plate portion 24 of the buckle stay 20. The portion of the upper surface laid on top of the coupling plate portion 24 allows the buckle base 10 to be coupled to the buckle stay 20 via the support shaft 30 inserted through the through-holes 13 and 23 in the bottom plate portion 11 and the coupling plate portion 24, the support shaft 30 being loosely inserted through the through-hole 23 of the coupling plate portion 24.

Thus, by having the portions coupled together via the support shaft 30 as a point of support, the buckle base 10 can tilt through a predetermined angle in the first direction X perpendicular to the plate surface of the bottom plate portion 11 and can pivot through a predetermined angle in the second direction Y parallel to the plate surface of the bottom plate portion 11, with respect to the buckle stay 20 (see FIG. 1).

The illustrated buckle is for a left seat. In a buckle for a right seat, the second direction Y in which the buckle base 10 pivots with respect to the buckle stay 20 is opposite to the second direction Y in a buckle for a left seat. Therefore, in the buckle for the right seat, the stopper 25, the fixation hole 26, and the spring housing groove 27 of the buckle stay 20 are provided at the respective opposite positions to those in a buckle for the left seat, with respect to the center in the width direction.

Figure 6A:
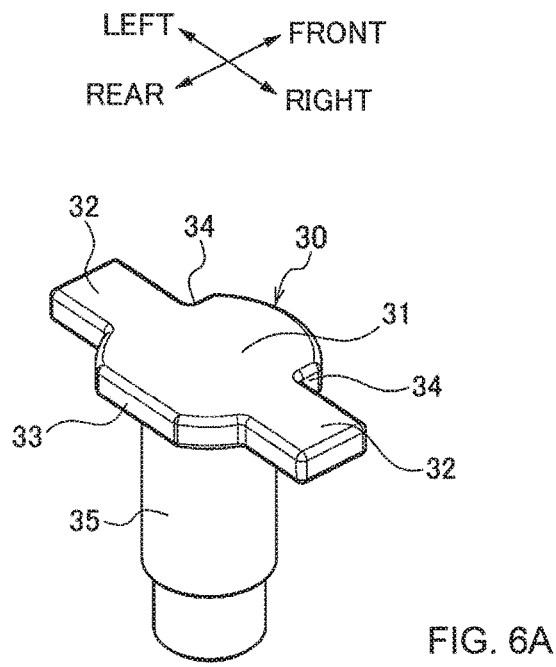
FIG. 6A is a perspective view depicting a configuration of a rivet used for the buckle of the present embodiment.
Figure 6B:
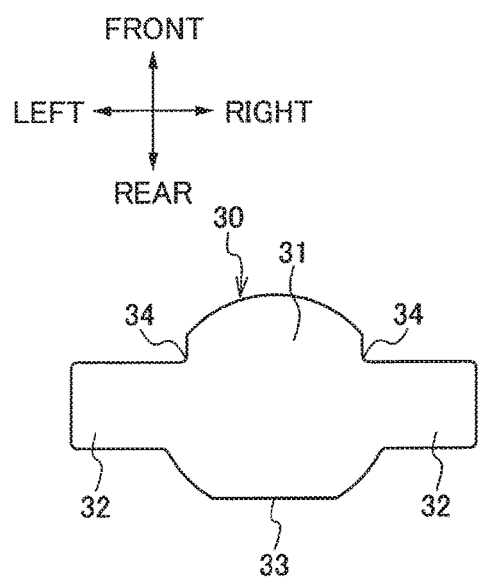
FIG. 6B is a top view of the rivet.

As depicted in FIG. 6, the support shaft 30 is formed laterally symmetrically so as to be used for the right and left seats in common. The support shaft 30 has a shaft portion main body 35 and a pair of arm portions 32 provided at an upper portion 31 of the shaft portion main body 35 and extending in the lateral direction. Tip portions of the arm portions 32 are coupled into the respective engagement grooves 16 formed in the side plate portions 12 of the buckle base 10. Root portions of the arm portions 32 at the upper portion 31 are formed by partly cutting out a circular flange having a larger diameter than the shaft portion main body 35. In other words, behind the root portions, a flat portion 33 is formed in association with a rear end of the buckle base 10 so as to allow a compact buckle cover to be designed. In front of the root portions, cutout portions 34 are each formed by cutting out a corner portion between a generally circular arc portion and the arm portion 32 such that the other end 50b of the coil spring 50 is held at the positions of the cutout portions 34.

The coil spring 50 is used as an elastic member that returns the buckle base 10 tilted in the first direction X and the buckle base 10 pivoted in the second direction Y to the original position.

When the coil spring 50 is used to assemble the buckle base 10 and the buckle stay 20 together, first, the coupling plate portion 24 of the buckle stay 20 is placed on the end 14 of the bottom plate portion 11 of the buckle base 10, and the through-hole 13 in the buckle base 10 is aligned with the through-hole 23 in the buckle stay 20. Then, the cutout portions 34 of the support shaft 30 are used to hold the other end 50b of the coil spring 50. The coil spring 50 is placed around the support shaft 30, and the end 50a of the coil spring 50 is fitted into the fixation hole 26 formed in the upper surface of the coupling plate portion 24 of the buckle stay 20. Then, while elastically deforming the coil spring 50, the tip portions of the pair of arm portions 32 of the support shaft 30 are fitted and coupled into the respective engagement grooves 16 in the fixation portion 15 of the buckle base 10.

In such an assembled state, the support shaft 30 is passed through the through-hole 23 in the buckle stay 20 and the through-hole 13 in the buckle base 10. The lower end of the support shaft 30 penetrating the through-hole 23 in the buckle stay 20 and the through-hole 13 in the buckle base 10 is collapsed and fixed to the lower surface of the bottom plate portion 11 of the buckle base 10.

Now, the operation and effects of the buckle of the present embodiment will be described.

When the buckle base 10 tilts in the first direction X with respect to the buckle stay 20, the coil spring 50 is pushed by the buckle stay 20 and deformed and bent in the first direction X. Therefore, an elastic reaction force of the coil spring 50 allows the buckle stay 20 to be pushed back to return the buckle base 10 to the original position.

When the buckle base 10 tilts in the first direction X with respect to the buckle stay 20, the distance between a front portion of the buckle stay 20 and the upper portion of the support shaft 30 is shortened. However, the coil spring 50 can be housed in the spring housing groove 27 in the buckle stay 20, allowing the coil spring 50 to be prevented from hindering the tilt of the buckle base 10. Consequently, the length of the buckle can be reduced by a value equal to the dimension of the spring housing groove 27 in a thickness direction of the coil spring 50.

When the buckle base 10 pivots in the second direction Y with respect to the buckle stay 20, the coil spring 50 is torsionally deformed in the second direction Y. Therefore, the elastic reaction force of the coil spring 50 allows the buckle stay 20 to be pushed back to return the buckle base 10 to the original position.

In the buckle configured as described above, the support shaft 30, which is a rivet, has the pair of arm portions 32 located at the upper portion 31 of the support shaft 30 and extending in the lateral direction, and the tip portions of the arm portions 32 are coupled into the respective engagement grooves 16 formed in the pair of side plate portions 12 of the buckle base 10. Consequently, the coil spring 50 can be assembled directly to the buckle base 10 without using the dedicated spring holding member. This enables a reduction in the height of the portion to which the coil spring 50 is assembled and thus in the thickness of the buckle. Furthermore, the support shaft 30 is coupled directly to the side plate portions 12 of the buckle base 10, eliminating the need for the dedicated spring holding member. This enables a reduction in the number of components and an increase in the strength with which the coil spring 50 is held on the buckle stay 20.

In the buckle of the present embodiment, the buckle stay 20 includes the stay main body 20a formed of a metallic plate and the collar 20b made of resin molded at the leading end of the stay main body 20a. In the collar 20b, the spring housing groove 27 is formed around the through-hole 23 in the buckle stay 20 and along the circumferential direction of the through-hole 23. The coil spring 50 is fitted into the spring housing groove 27 when the buckle base 10 tilts in the first direction X with respect to the buckle stay. Therefore, the length of the support shaft 30 can be reduced by a value equal to the dimension of the spring housing groove 27 in the thickness direction of the coil spring 50. This enables a reduction in the thickness of the whole buckle.

The present invention is not limited to the above-described embodiment, and variations, improvements, or the like may be made to the embodiment as needed. In addition, the materials, shapes, dimensions, numbers, arrangement positions, and the like of the components of the above-described embodiment are optional and not limited as long as the present invention can be accomplished.

The present invention may have any configuration as long as the support shaft 30 is coupled into the engagement grooves 16 in the buckle base 10 via the arm portions 32. The elastic member used for the present invention is not limited to the coil spring but may be a damper member made of rubber depicted in FIG. 7 or a flat spring depicted in FIG. 8.

Figure 7A:
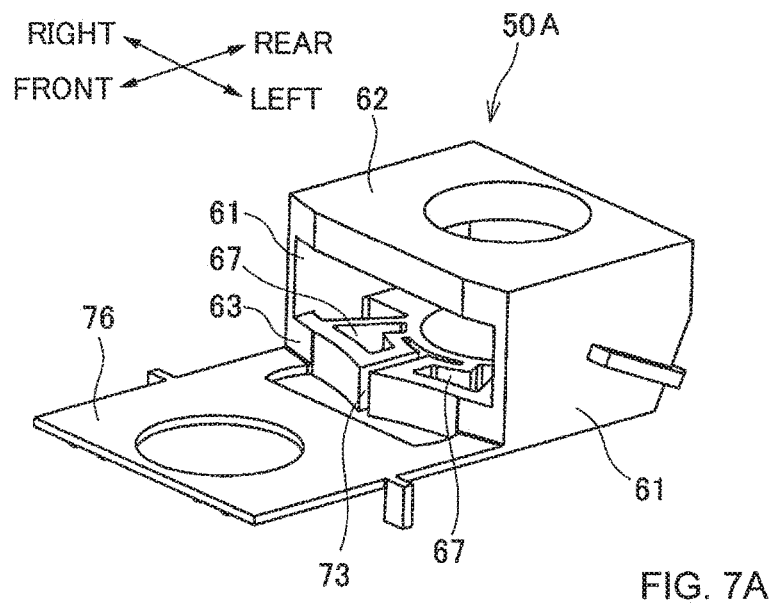
FIG. 7A is a perspective view depicting a damper member made of rubber that is applied to a buckle according to a first variation of the present invention.
Figure 7B:
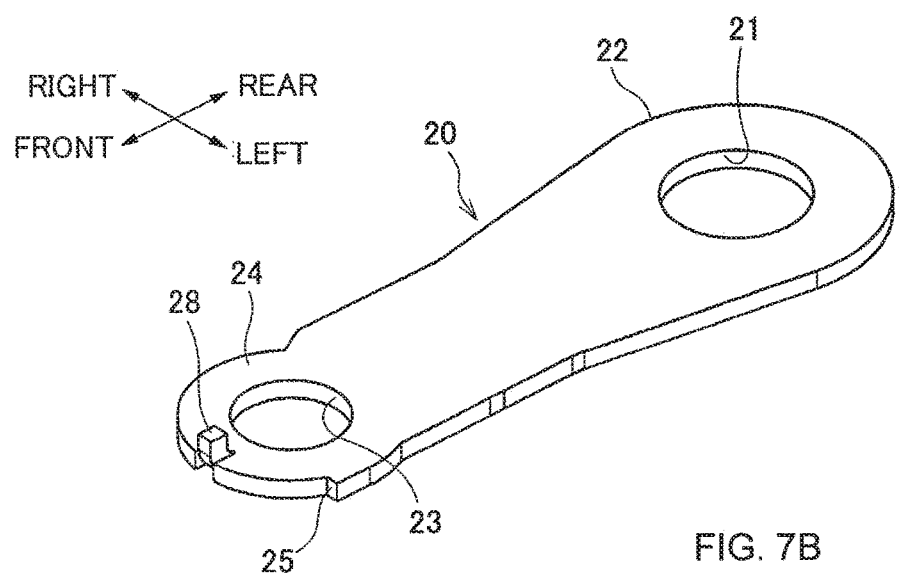
FIG. 7B is a perspective view of a buckle stay.

For example, a damper member 50A made of rubber depicted in FIG. 7A has a pair of side wall portions 61 extending along the respective side plate portions 12 of the buckle base 10 and contacting the respective side plate portions 12, an upper wall portion 62 located above the side wall portions 61 to couple the side wall portions 61 together, and a lower wall portion 63 located below the side wall portions 61 to couple the side wall portions 61 together and contacting the upper surface of the buckle stay 20. An intermediate portion of the lower wall portion 63 in the width direction has a fitting groove 73 in which a stay locking portion 28 provided at a leading end of the buckle stay 20 and depicted in FIG. 7B is fitted. The lower wall portion 63 has a lightened portion 67 that permits displacement of the stay locking portion 28 and the fitting groove 73 relative to the buckle base 10 when the buckle base 10 pivots in the second direction Y with respect to the buckle stay 20.

In this case, when the tip portions of the arm portions 32 of the support shaft 30 is coupled into the respective engagement grooves 16, the upper portion 31 of the support shaft 30 comes into contact with the upper wall portion 62 of the damper member 50A and the side plate portions 12 of the buckle base 10 come into contact with the respective side wall portions 61. The upper portion 31 and the side plate portions 12 thus provide the function of the elastic member of the present invention.

The damper member 50A has a holding portion 76 that is continuous with a lower portion of the damper member 50A and that is interposed between the buckle base 10 and the buckle stay 20 by cooperating with the lower portion in holding the buckle stay 20 between the holding portion 76 and the lower portion. Consequently, the buckle stay 20 can be configured with no collar.

Figure 8A:
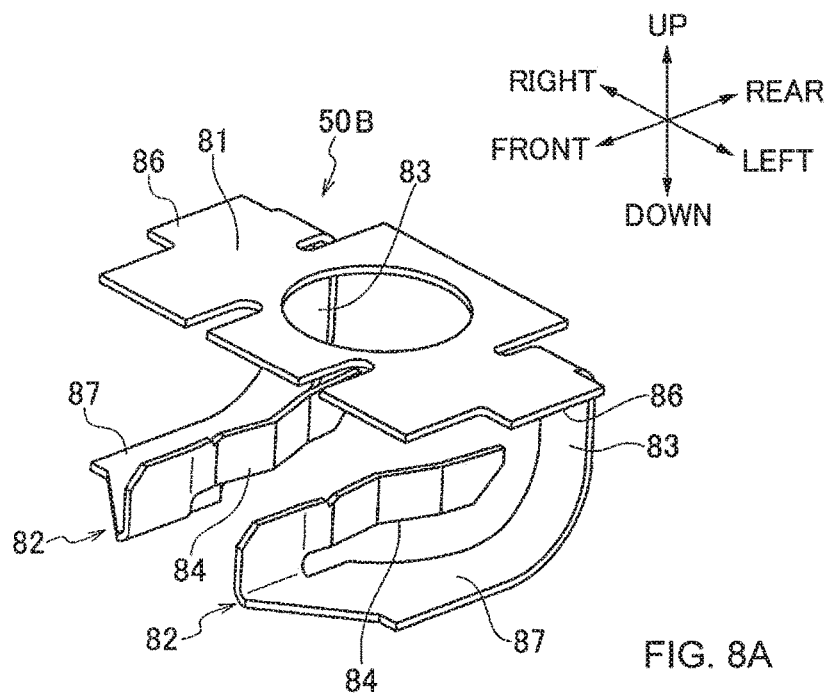
FIG. 8A is a perspective view depicting a flat spring applied to a buckle according to a second variation of the present invention.
Figure 8B:
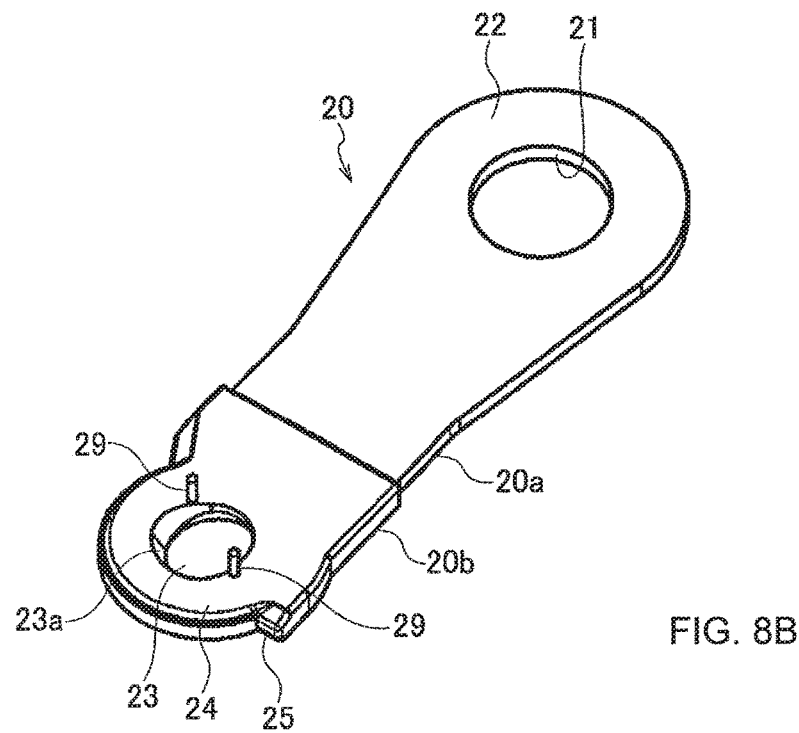
FIG. 8B is a perspective view of a buckle stay.

A flat spring 50B depicted in FIG. 8A includes an upper plate portion 81 with engaging protruding pieces 86 provided at laterally opposite edges of the upper plate portion 81, a lower plate portion 82 including a right and a left contact portions 87 that are pressed against the upper surface of the buckle stay 20 and a right and a left spring portions 84 connected to the contact portions 87, and a vertically coupling portion 83 that joins the upper plate portion 81 and the lower plate portion 82 together. The vertically coupling portion 83 is deformed and bent when the buckle base 10 tilts in the first direction X with respect to the buckle stay 20. The spring portions 84 are pushed by pins 29 provided on the buckle stay 20 depicted in FIG. 8B and deformed and bent when the buckle base 10 pivots in the second direction Y with respect to the buckle stay 20. The vertically coupling portion 83 and the spring portions 84 provide the function of the elastic member of the present invention. In this case, the engaging protruding pieces 86 of the flat spring 50B may be coupled into the engagement grooves 16 along with the tip portions of the arm portions 32 of the support shaft 30.

The present invention has been described in detail with reference to a specific embodiment. However, it is apparent to those skilled in the art that various changes and modifications may be made to the embodiment without departing from the spirit and scopes of the present invention.

While the above description constitutes the preferred embodiment of the present invention, it will be appreciated that the invention is susceptible to modification, variation and change without departing from the proper scope and fair meaning of the accompanying claims.

The invention claimed is:

1. A buckle for a seatbelt apparatus comprising:
 a buckle stay that has a fixation portion provided at a base end of the buckle stay and adapted to be fixed to a vehicle body, and a coupling plate portion provided at a leading end of the buckle stay and having a first through-hole;
 a buckle base having a bottom plate portion and a pair of side plate portions standing up from opposite side edges of the bottom plate portion, the buckle base also having a second through-hole formed at one end of the bottom plate portion, the side plate portions extending in a longitudinal direction along the bottom plate to overlie a longitudinal position of the second through hole;
 a support shaft inserted through the first and the second through-holes, the support shaft being loosely inserted through the first through-hole in the coupling plate portion, to allow the buckle base to be coupled to the buckle stay so as to be able to tilt with respect to the buckle stay through a predetermined angle in a first direction perpendicular to a plate surface of the bottom plate portion and further so as to be able to pivot with respect to the buckle stay, through a predetermined angle in a second direction parallel to the plate surface of the bottom plate portion;

an elastic member that when the buckle base tilts in the first direction and pivots in the second direction, urges the buckle stay to return the buckle base from a deflected position to an original position, the support shaft integrally forming a generally cylindrical shaft main body and a pair of arm portions provided at an upper portion of the support shaft and extending from a longitudinal axis of the main body in opposing lateral directions, a lower end of the support shaft main body is collapsed against a lower surface of the bottom plate portion of the buckle base to fix the support shaft to the buckle base, the arm portions trapping the buckle stay between the arm portions and the buckle base, and tip portions of the pair of arm portions are coupled into respective engagement grooves formed in the pair of side plate portions of the buckle base, the engagement grooves cooperating with the pair of arm portions to fix a rotational position of the support shaft relative to the buckle base, the support shaft fixed to the buckle base adjacent to the second through-hole to fixedly mount the support shaft to the buckle base bottom plate portion.

2. The buckle for the seatbelt apparatus according to claim 1, further comprising wherein the elastic member is a coil spring.

3. The buckle for the seatbelt apparatus according to claim 2, further comprising wherein:

the buckle stay includes a stay main body formed of a metallic plate and a collar made of a resin molded at a leading end of the stay main body, a spring housing groove formed in the collar around the first through-hole in the buckle stay and along a circumferential direction of the first through-hole, and the coil spring is fitted into the spring housing groove when the buckle base tilts in the first direction with respect to the buckle stay.

4. The buckle for the seatbelt apparatus according to claim 3, further comprising wherein the spring housing groove is formed to be laterally asymmetric with respect to a longitudinal center line of the buckle stay passing through a center of the first through-hole in the buckle stay.

5. The buckle for the seatbelt apparatus according to claim 3, further comprising a fixation hole in which an end of the coil spring is fixed is formed in the buckle stay, and the spring housing groove is formed to extend from a position adjacent to the fixation hole toward a front of the first through-hole along the circumferential direction of the first through-hole and at least beyond the front of the first through-hole.

6. The buckle for the seatbelt apparatus according to claim 1, further comprising wherein the elastic member is a damper member made of rubber.

7. The buckle for the seatbelt apparatus according to claim 1, further comprising wherein:

the elastic member is a flat spring including an upper plate portion and a lower plate portion that contact the arm portions and the buckle stay, respectively, and a vertical coupling portion that couples the upper plate portion and the lower plate portion together, and the lower plate portion has a spring portion that, when the buckle base pivots in the second direction with respect to the buckle stay, is pushed by the buckle stay and is deformed and bent in the second direction so as to return the buckle base to the original position.

8. The seatbelt apparatus comprising the buckle according to claim 1.

9. The buckle for the seatbelt apparatus according to claim 1, further comprising a collar formed of a resin and formed at the leading end of the buckle stay, the collar forming an inner peripheral wall of the first through-hole.

10. The buckle for the seatbelt apparatus according to claim 1, further comprising, a stopper formed at the leading end of the buckle stay which regulates the buckle stay such that the buckle stay can pivot toward a first side relative to the buckle base but is prevented from pivoting toward a second side relative to the buckle base.

* * * * *